2,859,237
ACID ABSORPTION OF OLEFINS

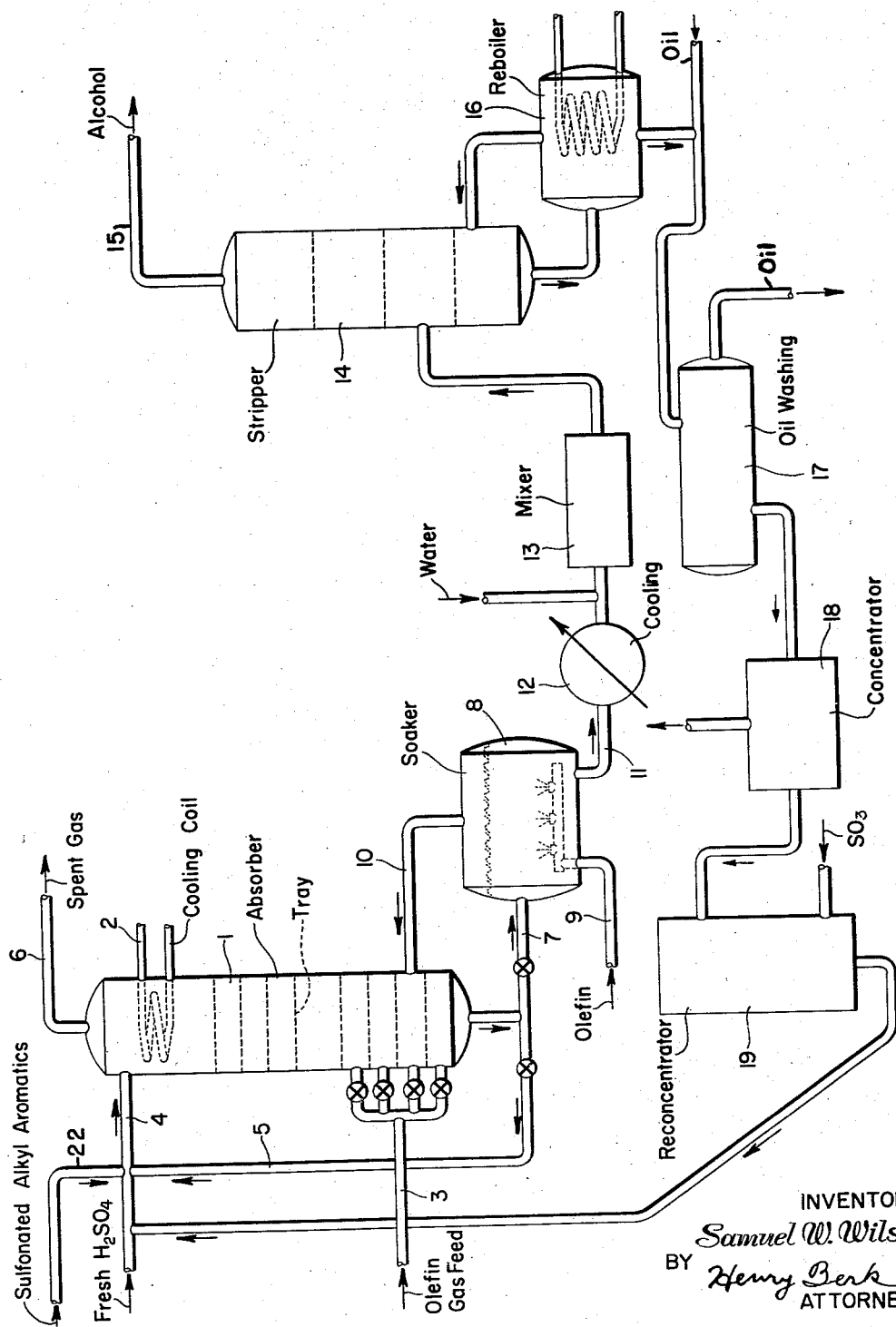

Samuel Winfield Wilson, Baton Rouge, La., assignor to Esso Research and Engineering Company, a corporation of Delaware Application April 12, 1957, Serial No. 653,266

4 Claims. (Cl. 260—460)

This invention relates to an improvement in the absorption of a gaseous olefin, e. g. ethylene, by an acid, e. g. sulfuric acid. It is concerned particularly with a countercurrent absorption process in which the olefin gas stream is intimately contacted with a stream of the liquid acid extract. Increased absorber capacity and more efficient overall operation are to be obtained in accordance with the present invention by admixing a suitable alkyl aryl sulfonate with the mineral acid extract used for absorbing the gaseous olefins bubbled up through liquid bodies of the extract.

It has been found from recent experiments that the absorber capacity limitations and adverse effects hitherto suffered on increasing the rate of absorption can be removed to considerable extent by providing the acid extract with a relatively small amount of admixed alkyl aryl sulfonate of high molecular weight, e. g. having an average molecular weight of about 330 or higher; said sulfonate characterized as being not more than slightly soluble in water, or in other words, of a hydrocarbon oil-soluble type. These include the alkaline earth metal salts, e. g. calcium, barium, etc., as well as the alkali metal sulfonates.

The problem of absorbing olefins by acids arises in the absorption of ethylene, propylene, butylenes and amylenes, generally by sulfuric acid, although for some purposes other mineral acids such as phosphoric acids may be used. The absorption step precedes steps of generating an alcohol, regenerating a selectively absorbed olefin. In any of these processes, wherein the problem of increasing absorber capacity arises, improvement can be made with the present invention applied thereto.

The operation of the invention will be described more particularly with reference to the absorption of ethylene by strong sulfuric acid for the manufacture of ethanol.

Kinds of processes to be improved by the present invention are described in U. S. Patents 2,474,568 and 2,474,569 of Bannon et al.

For the manufacture of ethanol, ethylene under pressure is absorbed in fresh or reconcentrated 93–99 wt. percent strength sulfuric acid usually at temperatures of 160° to 190° F. Usually in plant practice, the olefin being absorbed is in a plant gas stream which contains other gaseous hydrocarbons or impurities. The olefin on being absorbed forms sulfates, e. g. ethylene forms, ethyl hydrogen sulfate and diethyl sulfate, until a desired saturation is reached, such as 1.30 moles of ethylene per mole of sulfuric acid or if desired the ethylene absorption unit can be controlled to maintain a lower saturation level, e. g. as low as 0.8 mole of ethylene per mole of sulfuric acid. The extract saturation can be easily controlled by recycling extract from a lower portion of the tower and/or by controlling the ratio of fresh acid to olefin feed.

A typical absorption system will be described with reference to the flow diagram of the drawing.

The absorption tower 1 is equipped with about 20 baffle trays, bubble plates, or similar gas-liquid mixing means to insure proper dispersion of the olefin-bearing gas. Cooling coils 2 may be provided between trays to control temperatures. The dilute olefin gas, e. g. plant ethylene, is introduced to the bottom part of the absorber tower 1 through any of the inlets from feed line 3. Fresh or regenerated acid is introduced from line 4 to the upper part of absorber 1 with an admixed portion of extract recycled thereto from a lower part of absorber 1 by line 5. Spent gas depleted of olefins absorbed is taken overhead from the absorber 1 by line 6. The unrecycled portion of extract withdrawn from the bottom of absorber 1 is passed by line 7 into a soaking vessel or soaker 8. Additional olefin, preferably more concentrated, may be supplied by line 9 into the extract to insure maximum absorption. Unabsorbed gas is returned from the soaker 8 through line 10 to the bottom part of absorber 1. From the soaker 8 the extract may be drawn off by line 11 continuously to be further processed in recovering the desired final product.

For example, the saturated ethylene sulfuric acid extract may be withdrawn from soaker 8 for subsequent hydrolysis by cooling in 12 and dilution with water in mixer 13 to about 50% sulfuric acid concentration on an alcohol ether free basis which releases ethanol with a minor amount of ether. Following the hydrolysis, the diluted extract is sent to stripper 14 to strip off the alcohol.

The alcohol product is withdrawn overhead by line 15 from stripper 14.

Spent acid bottoms from stripper 14 are subjected to reboiling in unit 16 and the acid can be partly concentrated therein. The reboiled spent acid is washed with inert oil to remove sludge impurities and carbonaceous material in unit 17.

A large variety of materials have been tried with varying success for treating the spent acid, prior to reconcentration, to remove carbonaceous materials therefrom.

The spent acid may be finally concentrated in a vacuum concentrator 18 to about a 90% level and then be fortified with oleum or $SO_3$ to the desired strength in acid fortification unit 19 for reuse in the absorber.

To admix the alkyl aryl sulfonates which are to be used for improving the absorption operation, they may be added to the acid entering the absorber from line 4 by injection through line 22, or they may be added to the reconcentrated acid in a previous step. Of course, they may be added at other points in the absorber or to the extract which is recycled in the absorber.

The oil-soluble alkyl aryl sulfonates, commonly known as petroleum sulfonates, are added as concentrate. For example, a concentrate blend of 10 to 70 wt. percent of the sulfonate in a non-volatile hydrocarbon oil is satisfactory although the dry sulfonate per se may be used. These non-volatile oils should have a relatively high initial boiling point of, for example, 615° F. Additional benefits are realized if the sulfonate concentrate is employed in further dilution with a heavy oil which also must be non-volatile. This heavy diluent oil may comprise any non-reactive, paraffinic or naphthenic heavy naphtha, lube oil or gas oil. Typical of the heavy diluent oils which may be employed for this purpose is "seal oil" which is an acid treated predominantly paraffinic mineral lube oil cut or an acid treated heavy gas oil boiling, for example, between 615° to 860° F. These seal oils aid in the inhibition of tower flooding and permit higher absorber capacities. Alkaline earth metal sulfonates or alkali metal sulfonates, e. g. calcium, barium, sodium or potassium, are preferably employed as a major active ingredient of the additive composition. The preferred ratio of seal oil to sulfonate concentrate is about 90:10 to 75:25.

The improvement obtained by using the alkyl aromatic sulfonates in the acid extract during the absorption is well illustrated by the following examples:

In the past it was found necessary to feed part of the dilute ethylene stream to the acid absorber at a number of trays above the bottom and at a limited rate to prevent holdup and carryover, commonly known as flooding.

A plant test was made using a 50% solution of oil-soluble petroleum sulfonates in high boiling oil added continuously at such a rate as to incorporate about 900 to 1000 p. p. m. of this solution or 450 to 500 p. p. m. of sulfonate in the acid extract being circulated in the absorber. A substantial reduction in foam formation was observed. Additional amounts of the sulfonate were added until about 1250 p. p. m. sulfonate were present in the acid extract. During the test the plant operations were closely observed, particularly with reference to the behavior of the absorber system, the acid wash system where the acid was freed of carbonaceous materials or tars, the vapor scrubbing system where the alcohol vapors were washed with caustic, and other alcohol finishing steps.

After foaming in the absorber had been satisfactorily suppressed as shown by static foam tests run on the absorber bottoms, the total dilute ethylene stream was passed into the bottom of the absorber. The absorber then operated smoothly with only a tendency to hold up occurring when the dilute ethylene rate was more than 30% greater than before the addition of the high molecular weight sulfonate solutions.

During the test operation while the oil-soluble sulfonates were admixed with the extract in the absorber the other plant operations ran smoothly. There was no indication of adverse effects from decomposition of the sulfonates. The hydrolysis, stripping and finishing of the alcohol, reboiling of the spent acid, and washing of the reboiled spent acid were carried out with no adverse effects. The washing step was changed somewhat in characteristics. The tar layer appeared to decrease, but it was found that there was no additional tar present in the wash acid according to carbon values.

Further tests were carried out to illustrate the advantages resulting from the employment of applicant's additives in the absorber. In these tests a maximum of 525,000 lbs. per day of ethylene was fed into an absorption tower, such as described previously, over an extended period of time without the absorber flooding, employing 3 to 5 gallons per hour of seal oil in the absence of sulfonate additive.

650,000 lbs. per day of ethylene feed were injected into the above absorber with 3 to 5 gallons per hour of a seal oil composition comprising 85% seal oil and 15% of a 70% concentrate of sodium petroleum sulfonate having an average molecular weight of about 420. These 3 to 5 gallons of additive are equivalent to approximately 45 to 75 p. p. m. of active sulfonate on acid extract. Even with this increased amount of ethylene feed no tower flooding was encountered and the absorption capacity of the tower was increased substantially. Accordingly, from 30 to 1500 p. p. m. of active sulfonate on acid is suitable for this process. The amount employed will be determined to a large extent by the economics involved, realizing that additional absorption capacity is offset to a certain extent by the cost of additive. In the above tests the acid extract saturation leaving the absorber was maintained between 0.9 to 1.0 mole of ethylene per mole of sulfuric acid. It is to be understood that the absorption capacity of the absorber as well as the tendency toward flooding is dependent to a certain degree on the ratio of sulfuric acid to ethylene feed. In general higher fresh acid rates permit higher capacities within the absorber but result in lower extract saturations.

It is to be understood that the oil-soluble sulfonated hydrocarbons which are to be admixed with or incorporated with the acid extract in the olefin absorption zone include various types of products, such as petroleum sulfonates and synthetic alkyl aromatic sulfonates. Materials which were tested and found suitable for the purpose at hand include "Petronate," a purified alkyl aryl sulfonate having a molecular weight of about 415 to 430 in a 60% concentration with mineral oil; "Kreelon," also a petroleum sulfonate having a molecular weight of about 350 and blended in oil; "Acto," 450, 500, 700 which are 45, 50 and 70% concentrations of sodium petroleum sulfonates having molecular weights of the order of 465 to 480 in high-boiling hydrocarbon oil. Thus the molecular weight of the sulfonate must be sufficient to render it oil-soluble.

This application is a continuation-in-part of application Serial Number 388,239, filed October 26, 1953, now abandoned.

What is claimed is:

1. In a process of absorbing gaseous ethylene by a concentrated sulfuric acid of 93 to 99 wt. percent wherein acid extract of the ethylene in feed acid is passed countercurrent to the gaseous ethylene, the improvement which comprises maintaining from 30 to 1500 p. p. m. of an oil-soluble alkyl aromatic sulfonate having a molecular weight of 350 to 480 in said acid extract, and bubbling gaseous ethylene through said acid extract containing said alkyl aromatic hydrocarbon sulfonate.

2. In a process of absorbing gaseous ethylene by a concentrated sulfuric acid of 93 to 99 wt. percent wherein said extract is passed countercurrent to the gaseous ethylene, the improvement which comprises continuously admixing a 10 to 70 wt. percent blend of an oil-soluble alkyl aromatic sulfonate having a molecular weight of 350 to 480 in a non-reacting, non-volatile hydrocarbon oil with said acid extract at a rate sufficient to incorporate from 30 to 1500 p. p. m. of sulfonate to said acid extract, and bubbling the gaseous ethylene through said acid extract containing the alkyl aromatic sulfonate to have the extract reach a saturation between about 0.8 to 1.3 moles of ethylene per mole of sulfuric acid.

3. A process in accordance with claim 2 wherein said blend of alkyl aromatic sulfonate having a molecular weight of 350 to 480 is added in combination with a non-volatile acid treated heavy oil.

4. In a process of absorbing gaseous ethylene by a concentrated sulfuric acid of 93 to 99 wt. percent wherein acid extract of the ethylene in feed acid is passed countercurrent to the gaseous ethylene, the improvement which comprises continuously admixing an oil-soluble sodium alkyl aromatic sulfonate having a molecular weight of 350 to 480 in the presence of a high boiling non-volatile hydrocarbon oil in an amount to maintain between about 30 to 1500 p. p. m. of sulfonate per million parts of acid extract and bubbling the gaseous ethylene through acid extract to reach a maximum extract saturation amounting to 1.3 moles of ethylene per mole of sulfuric acid.

References Cited in the file of this patent

UNITED STATES PATENTS

| | | |
|---|---|---|
| 1,843,862 | Buc | Feb. 2, 1932 |
| 2,400,376 | Showalter | May 14, 1946 |
| 2,545,161 | Morrell et al. | Mar. 13, 1951 |